July 25, 1939.    F. W. BURGER    2,167,101
HUB CAP
Filed April 29, 1935    2 Sheets-Sheet 1

Inventor:
Frederick W. Burger

July 25, 1939.  F. W. BURGER  2,167,101
HUB CAP
Filed April 29, 1935  2 Sheets-Sheet 2

Inventor:
Frederick W. Burger
By:
Attys.

Patented July 25, 1939

2,167,101

UNITED STATES PATENT OFFICE 2,167,101

HUB CAP

Frederick W. Burger, Niles, Mich., assignor to Clark Equipment Company, Buchanan, Mich., a corporation of Michigan Application April 29, 1935, Serial No. 18,731

1 Claim. (Cl. 301—108)

The present invention relates generally to hub caps for automobile vehicles, such as automobiles, trucks, busses, and the like, and is particularly concerned with the provision of a hub cap having new and useful means for fastening it to the wheel with which it is associated.

Heretofore hub caps for motor vehicle wheels and the like have been provided with various forms of latches, or such latches have been carried on the wheel, for removably securing the hub cap in place. Generally such means includes flat springs having ends especially formed or carrying means serving as detents, and usually such flat spring means has been fastened to the part carrying the same by rivets or the like.

The principal object of the present invention is to provide a simplified form of attaching means for hub caps and the like, and preferably such means is carried by and forms a part of the hub cap itself. More specifically, it is an object of the present invention to provide resilient means in the form of wire spring sections arranged to resiliently engage and be connected with the hub of the wheel on which the hub cap is applied.

In one form of the present invention, the wire spring sections form a part of a single ring-like member carried by the hub and having flattened sections serving as the hub engaging parts, and preferably the hub itself is provided with a groove to receive such sections. Since each of the sections, or the spring ring member of which they are formed, are resilient, it is a simple matter to snap the hub cap in place on the wheel.

Another object of the present invention is the provision of a hub cap having a beaded and flanged section arranged to embrace the hub of the wheel to which the hub cap is to be attached and to receive and secure in place the spring member or members which engage the wheel and hold the hub cap thereon. In this construction, the hub engaging portions of such spring wire sections are spaced from the edge of the hub cap proper so as to be in a position to be engaged in a groove or notch formed in the hub of the wheel.

By virtue of the above features, the spring retaining means can be quickly attached to the hub cap by relatively simple and inexpensive operations so as to serve as a part thereof. This provides for the easy and convenient application to and removal of the hub cap from the wheel without any danger of the retaining means breaking or otherwise becoming ineffective. Also, by virtue of the use of wire spring sections, the need for a relatively wide flange on the hub cap or the wheel hub is eliminated, for a relatively small groove or notch is sufficient to provide for the secure attachment of the hub cap to the wheel.

These and other objects and advantages of the present invention will be apparent to those skilled in the art after a consideration of the following description of the preferred construction, taken in conjunction with the accompanying drawings illustrating the same.

In the drawings:

Figure 3 is a fragmentary view taken along the line 3—3 of Figure 2 and looking in the direction of the arrows;

Figure 4 is a view taken along the line 4—4 of Figure 2;

Figure 6 is a view similar to Figures 2 and 5 but showing a further modified form;

Figure 7 is a detailed sectional view of a modification of Figure 6 showing the individual wire springs as disclosed in Figure 5.

Figure 1:
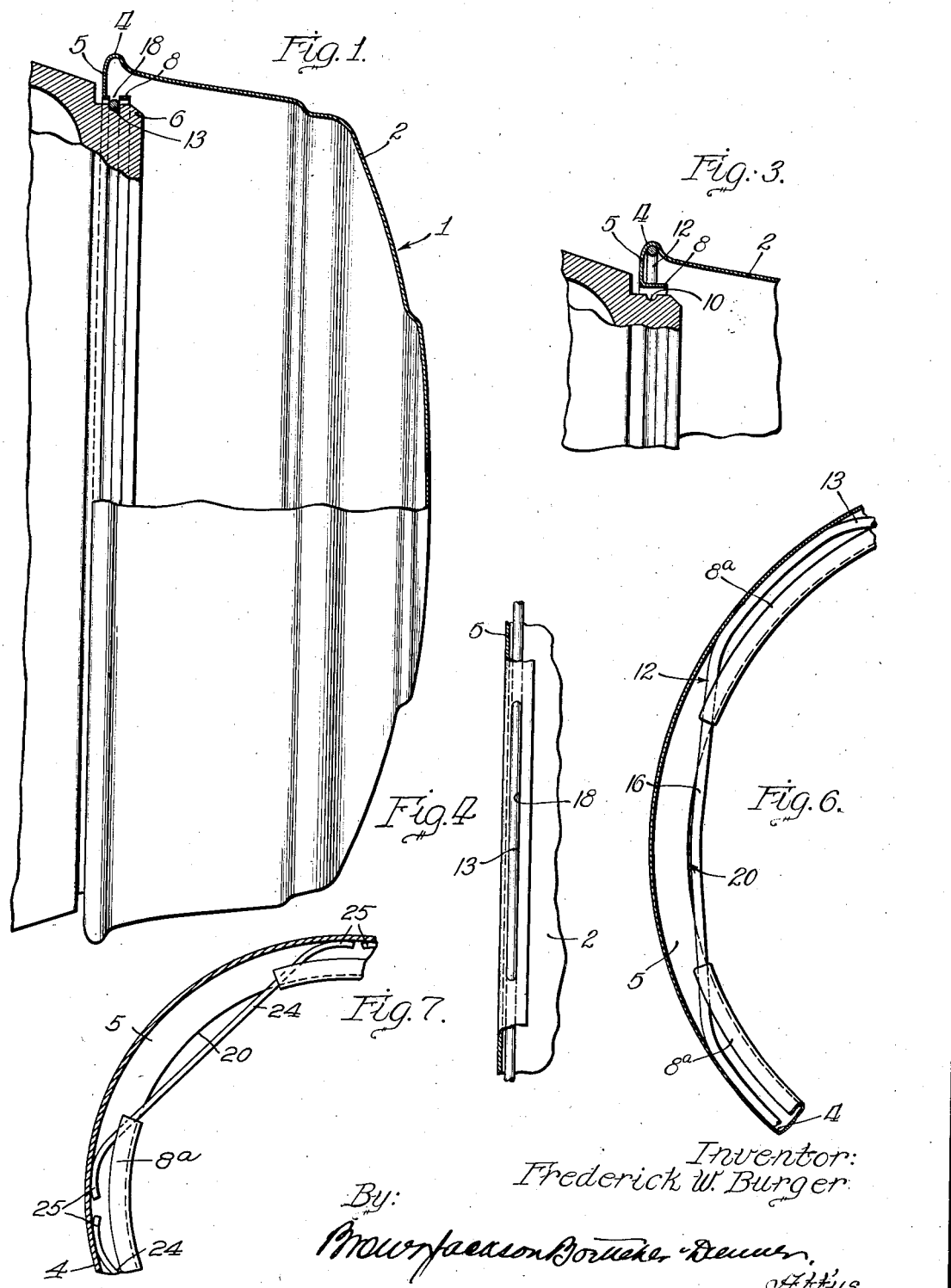
Figure 1 is a section taken along the line 1—1 of Figure 2 through a hub cap constructed according to the principles of the present invention, certain of the parts being shown in elevation.

Referring now to the drawings, particularly Figures 1 to 4, the reference numeral 1 indicates the hub cap in its entirety and, as shown, the hub cap provides a generally concave or dished body member or shell 2 having a beaded edge portion 4 from which a generally radially inwardly disposed flange portion 5 extends. This is the portion of the hub cap which is applied next to and receives the hub 6 of the wheel on which the hub cap is mounted. The radially inwardly directed flanged portion 5 terminates radially inwardly in a laterally directed inturned flange portion 8 which is of generally cylindrical formation and fits fairly close around the hub 6 of the wheel. The hub 6 may be of cast or pressed metal, or any other suitable material.

Figure 2:
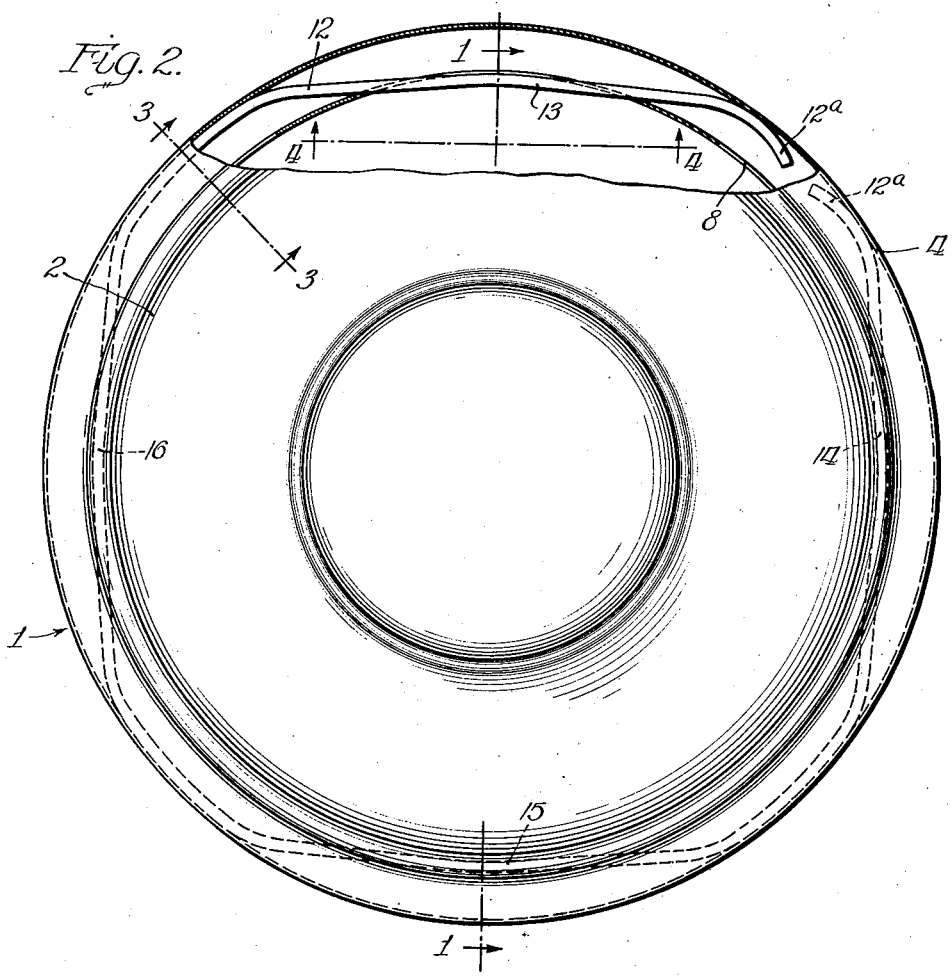
Figure 2 is an end view showing the disposition of the spring means on the inside of the hub cap.

The hub 6 of the wheel is grooved, as at 10 (Figure 3), and the interior of the beaded section 4 of the hub cap carries attaching means in the form of a spring wire member 12, best shown in Figure 2. The member 12 is provided with curved ends 12a and generally flattened sections 13, 14, 15 and 16, the intermediate portions between these sections being generally circular and lying within and held in place by the beaded portion 4 of the hub cap. The sections 13, 14, 15 and 16 are formed to lie, somewhat as chords of the circle containing the aforesaid intermediate portions, radially inwardly of the inturned flanged portion 8, as best shown in Figures 1 and 2. The inturned portions 8 are slotted, as at 18, so as to receive these sections, the portions of the inturned flange lying between the flattened spring wire sections 13, 14, 15 and 16 serving to retain the spring sections in their proper position, as best shown in Figure 2.

When the hub cap is pressed onto the hub 6, the spring sections 13, 14, 15 and 16 snap into the groove or recess 10, the resiliency of the sections serving to allow the easy attachment of the hub cap while securely holding it in place on the wheel. Yet it is a relatively simple manner to pry the hub cap off with a suitable tool, such as a screw driver or the like as is common practice.

Figure 5:
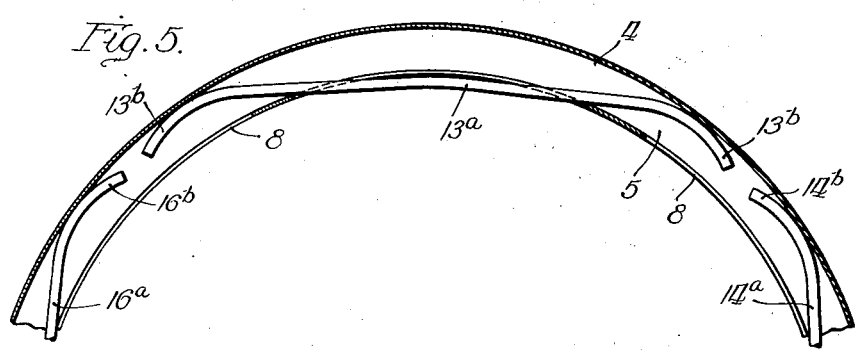
Figure 5 is a view similar to Figure 2 but illustrating a modified form of the present invention employing a plurality of separate wire springs.

The spring wire sections 13, 14, 15 and 16 form an inexpensive resilient locking means for holding the hub cap on the hub of the wheel with which it is associated. The spring wire retains its resiliency throughout the life of the device so that there is little likelihood of a hub cap becoming lost or accidentally detached. The wire spring sections may be formed as a part of a single loop of wire, as best shown in Figure 2, in which the member 12 serves as a snap ring for holding the hub cap on the wheel. If desired, the sections may be separately formed, as shown in Figure 5 in which the individual sections are indicated by reference numerals 13a, 14a, etc., and each have rounded ends 13b, 14b, etc., similar to the rounded or curved ends 12a shown in Figure 2. Preferably, however, the wire spring means is formed as shown in Figure 2, but it is to be further understood that an endless wire ring may be employed if found feasible.

In the manufacture and assembly of my hub cap, the slots 18 are preferably formed in the edge of the flange 5 before the inturned flanged portion 8 thereof is formed, which is preferably done by spinning the metal. However, it is to be understood that the flange portion receiving the wire sections 13, 14, 15 and 16 and holding them in position may be formed with slots or other wire receiving means after the inturned flange has been formed. Also, as best shown at 20 in Figure 6, the portions of the inturned flange 8 adjacent the spring wire sections 13, 14, 15 and 16 may be omitted, if desired, and the other portions 8a may be turned back over the wire springs after the latter have been inserted, exposing only the portions 13, 14, etc., thereof which extend radially inwardly of the flange 5 to engage the groove 10 of the hub 6. Individual spring wire sections, such as those shown in Figure 5, may be employed in the form of hub cap shell shown in Figure 6.

In Figure 7 a modification of Figure 6 is shown in which a plurality of separate wire springs 24 are mounted corresponding to the individual spring wire sections 13a to 16a, inclusive, of Figures 2 and 5. These spring wire sections 24 are provided with the curved end portions 25 which bear against the bead 4 of the hub cap.

The present invention is not particularly concerned with the particular form of the body 2 of the hub cap. As illustrated, this may be one piece, but if desired the hub cap may be formed of separate pieces. Also, it is not necessarily essential to the principles of the present invention that the inturned flange portion 5 be integral with the body portion 2 of the hub cap. These parts may be made separate if desired and secured together in any desired manner.

While I have described above the preferred construction in which the principles of the present invention have been embodied, it is to be understood that my invention is not to be limited except as defined by the scope and spirit of the appended claims.

What I claim, therefore, and desire to secure by Letters Patent is:

A hub cap for detachable mounting over an external annular surface of a hub, said hub having an outwardly directed groove therein, said hub cap comprising a dish-shaped body portion having a radial inwardly directed flange at its periphery terminating in an axially inwardly directed annular lip, said lip having circumferentially spaced cut out portions therein and having edge portions thereof intermediate said cut out portions turned radially outwardly to define radially outwardly directed channels disposed within the radially spaced internal peripheral surface of said body portion, a plurality of independent spring wire sections disposed with the ends thereof in said channels and bearing against said internal peripheral surface of said body portion, the intermediate portions of each wire section forming substantially chordal portions extending across and partially projecting radially inwardly of said cut out portions, the adjacent ends of said wire sections being circumferentially spaced to accommodate outward arching of said chordal portions during telescoping movement of said lip over said hub surface and reacting against said internal peripheral surface of said body portion to spring said chordal portions through said cut out portions into the groove of said hub surface as said cut out portions move into radial alinement therewith.

FREDERICK W. BURGER.